Aug. 7, 1951     H. W. JONKHOFF     2,563,338
VEHICLE TRUCK
Filed May 15, 1944     2 Sheets-Sheet 1
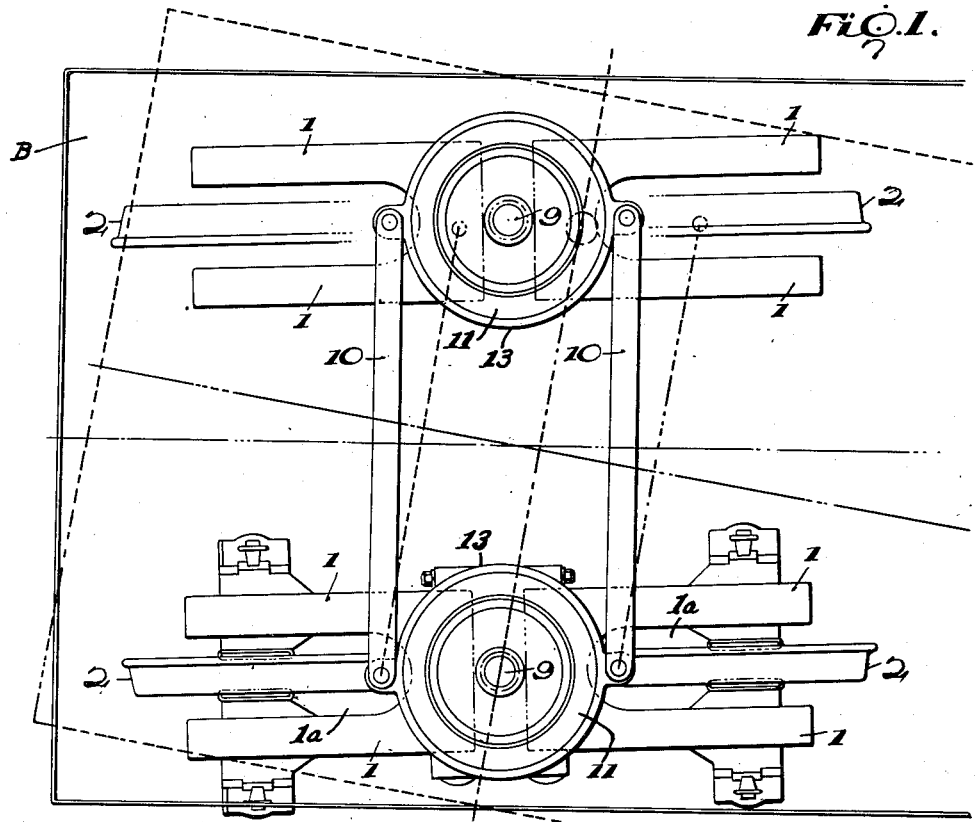
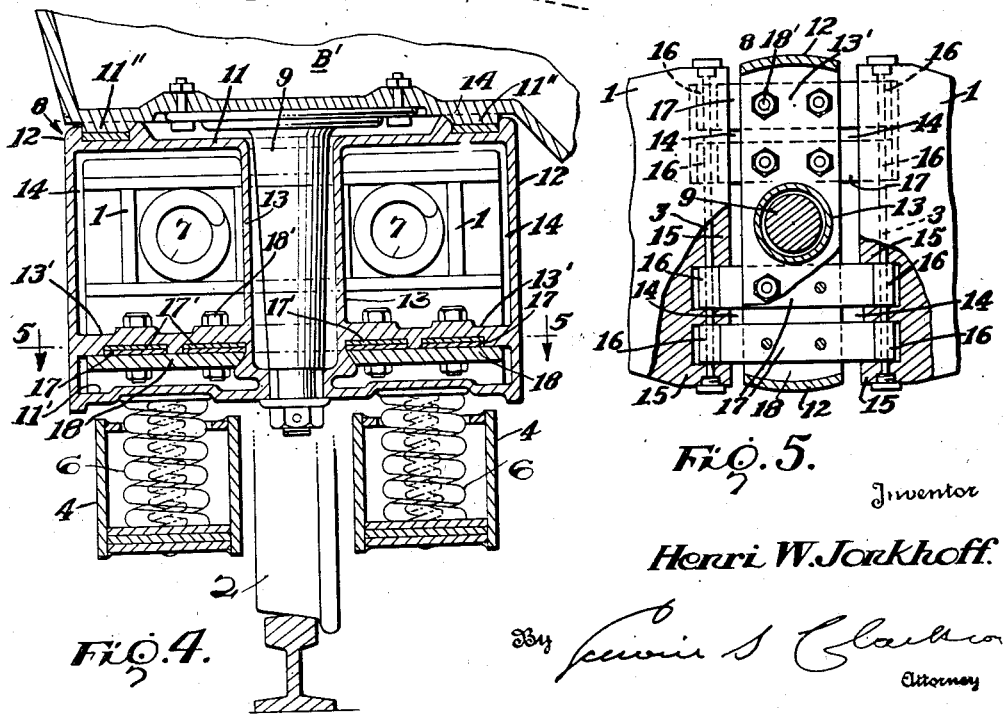
Inventor
Henri W. Jonkhoff
By
Attorney

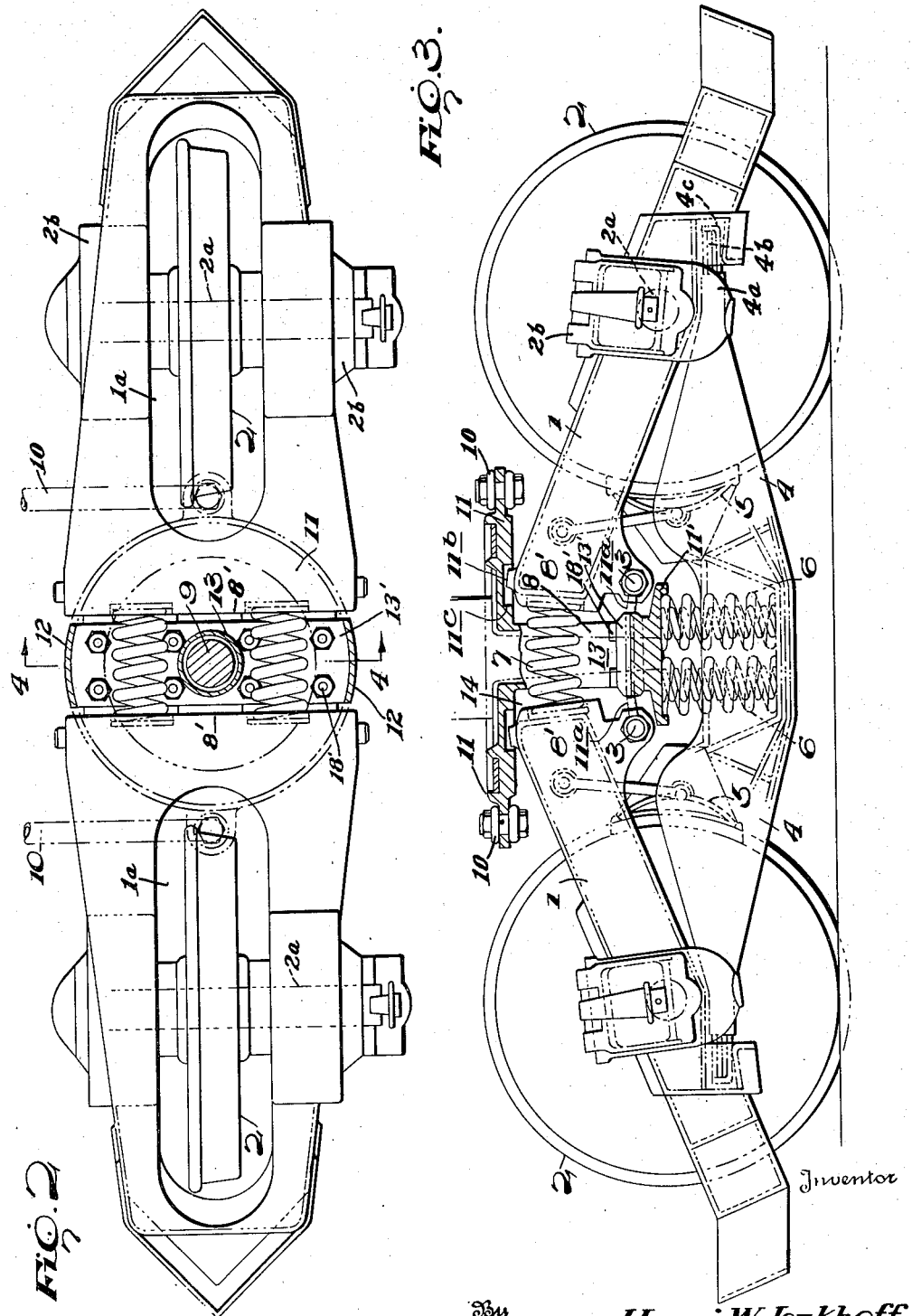

Patented Aug. 7, 1951

2,563,338

UNITED STATES PATENT OFFICE 2,563,338

VEHICLE TRUCK

Henri W. Jonkhoff, New York, N. Y.; Ainsworth B. Blood and Stanleigh P. Friedman executors of said Henri W. Jonkhoff, deceased Application May 15, 1944, Serial No. 535,668

17 Claims. (Cl. 105—179)

This invention relates to improvements in railway and other vehicle trucks, and has for its object to provide a truck embodying truck halves or sections independently swiveled to the vehicle and pivotally connected to each other to swing in unison, each section having novel means for sustaining the weight of the load and springing the wheels to cushion and reduce to a minimum the shock forces transmitted to the vehicle, whereby smoother riding of the vehicle is ensured.

The invention consists of the novel features of construction, combination and arrangement of parts hereinafter more fully described and claimed, and shown in the accompanying drawings, in which:

Figure 1 is a top plan view of a vehicle truck embodying my invention.

Figure 2 is a top plan view of a single truck section detached.

Figure 3 is a side elevation of Figure 2.

Figure 4 is a vertical sectional view on the line 4—4 of Figure 2.

Figure 5 is a horizontal transverse section taken substantially on the line 5—5 of Figure 4.

My new construction of parallel half-trucks provides for the use of a special wheel and spring suspension so as to obtain highly efficient cushioning and shock absorbing actions to secure easy riding of the vehicle. Each of these half-trucks or truck sections comprises a pair of rigid wheel carrying arms 1 carrying independently sprung wheels 2. These arms, each of which carries one wheel, are pivotally connected at their inner ends by pivotal connections 3 with the truck pedestal or load transmitting member 8, from which the arms extend in opposite directions forwardly and rearwardly, and respectively carry the front and rear wheels at their extreme outer ends. The front wheel carrying arm transmits the horizontal pushing power from the pedestal 8 to the front wheel, while the rear wheel is pulled along by the arm which carries its axle. The wheel carrying arms, moreover, determine the distance between the wheel axles and the pedestal 8, and their use avoids many mechanical problems. Furthermore, the wheel brakes 5 may be mounted on said arms 1, thereby eliminating any working difficulties in suspending and operating the brake shoes for the reason that each arm and the wheel brake carried by it both turn around the same wheel axle in making vertical movements.

It will be noticed that the wheel carrying arms 1 do not carry the weight of the load. This makes it possible to do away with direct pivotal connections between the wheel carrying arms and the pedestal and flexible connections can take the place of such pivotal connections. Hereinafter it will be explained how a wide flexible pivotal connection between each wheel carrying arm and the pedestal can be made to resist side thrust as well as much more costly pivots directly connecting the arms to the pedestal.

To control the vertical movements of the wheel carrying arms 1, a special springing device 7 has been developed based on a new principle, borne out of practical experience. A light spring for light loads and a heavy spring for heavy loads will not serve for present day vehicles. In a loaded car the capacity for sensitive movement in the heavy spring is absolutely dead. An additional device, serving this purpose and acting independently from the heavy spring, has to be introduced. The main spring 6 takes up the static weight and the additional device 7 takes care of the movements in the unsprung weight of the vehicle during the riding. The solution of the difficulty consists of the addition of a load carrying member in the form of a rigid equalizing beam or lever 4, which works immediately without any delay and long before the heavy spring can show its reaction to any vertical wheel movement. At the same time, the springing devices 7, controlling the vertical movements of the wheels through the arms 1, form a connection linking the spring action between the front and rear wheels so as to allow the equalizing or balancing beam means 4 to function. High efficiency in this connection is obtained by providing two springing devices 6, 7 not interfering with each other's functions, while still allowing them to work harmoniously together.

In my construction the rigid longitudinal member 4 arranged beneath the wheel arms, forms the balancing lever or bridge between the front and the rear wheels, and the coil springs 6, disposed between the center of the member 4 and the base of the pedestal 8, transmit to the member 4 the load falling on the truck pedestal from the car body of platform B or from the bolster B' fastened to the car body or platform. Said coil springs 6 under load permit the longitudinal member 4 to rock freely and to act as a balancing distributor of the weight.

As shown in the drawings, the two wheel arms 1 extend at their outer ends beyond the wheel axles so as to facilitate construction and so as to provide for a still more favorable effect, making the springing devices overhang at the ends of the truck section. The arms 1 are forked or slotted to form openings 1a to receive the upper portions of the wheels 2 which turn therein, and the arm portions which lie on opposite sides of the wheels are transversely apertured for passage of the wheel axles 2a and provided with bearings or journal boxes 2b in which the axles are journaled, whereby the wheels are mounted for rotation on the arms 1 and the arms 1 are pivotally mounted to rock upon the axles. The bearings or journal boxes are suitably mounted on the arms 1 and the boxes at the sides of the respective arms are provided with guide plates 4a which depend therefrom and engage the sides of the ends of the beam 4 to hold the arms and ends of the beam from relative sidewise movement or lateral displacement. The end portions of the beam extend between and beyond the plates and terminate in laminated spring tongue portions 4b slidably and pivotally engaging pockets 4c formed in the arms 1 or boxes 2 whereby such relative movements between the arms and beam are permitted.

The inner ends of the arms 1 project inwardly beyond the pivots 3, thus forming short lever arms 8' at said ends of the arms 1, and in addition to the coil springs 6, inserted between the truck pedestal and the rigid longitudinal member 4, another set of coil springs 7 is disposed between said lever arms 8'. These springs 7 link the arms to yieldingly resist movements of the lever arm portions 8 toward each other and act as shock absorbers, limiting the upward swing of the wheel carrying ends of the arms 1. For this reason the springs 7 also operate as cushioning means for and in conjunction with the balancing lever 4 which has no fixed connection to the truck pedestal. Stops 11b, in the form of short ribs on the upper end of the wheel carrying arms 1, which engage short recesses 11c in the turntable section 11 fixed to the top of the pedestal are provided to limit the downward movement of the wheel carrying arms in unloaded cars. They are needed in case the truck has to be lifted from the rails for any purpose, in which case the arms have to be kept horizontal to protect or prevent injury to the flexible pivotal connections between the arms and the pedestal 8.

The wheel carrying arms 1, each being free to rock with the rigid longitudinal member 4, combined with the shock absorbing springing device 7, inserted between the upper extremities of said arms, make up the additional springing means mentioned before. They provide for the absorption of vibrations in the unsprung parts of the truck, during the riding, independently from the coil springs 6 actually carrying the constant weight of the load. The load of the car body on the pedestal is carried by the coil springs 6 underneath the pedestal and they are kept under a constant pressure once the car is loaded and they transmit the load weight in a constant way to the middle part of the longitudinal member 4, not disturbed by, and without interfering with, its function as a balancing equalizer of weight during the riding.

The absorption of shocks due to the unevenness of the road surface not only starts right at each single wheel axle, reducing the unsprung weight to a minimum, but the independent balancing means of the dual sets of springing devices on the right and left half-truck sections break up and prevent any coordination between the vertical motion waves in the right and left wheels of the vehicle which, in the conventional type of railway truck, results in the swaying of the platform. Said additional springing means 7 practically absorb and arrest the vertical movements of the wheels created during the riding before they can reach or affect the position of the pedestal. The load weight on the pedestal, therefore, can be transmitted by the supporting coil springs 6 to the beam 4 in a constant way, by which stability of the platform is secured.

The stability of the two half-trucks depends on the continuous parallel relationship between the two half-trucks under all circumstances. Therefore, in the present construction, the two truck pedestals, at their top ends are pivotally interconnected by the cross links 10, on the right and left sides of the cross beam, in line with the king pins at points normally coincident with the longitudinal axis of each half truck or truck section.

In the conventional railway truck, the central pin has a major function, but it has to resist merely horizontal stresses, as the vertical stresses, involved in centrifugal forces, are taken up by the right and left wheels at the lower end of the structure. In the present construction, however, vertical stresses have to be taken care of at the top of the truck structure where it is connected to the platform. A king pin could not be made practically strong enough for the purpose and, therefore, in the present construction, this pin has a minor function only. It has been relieved from horizontal and vertical stresses by adding turntables each having a working diameter of 26 inches. In the construction disclosed, employing, for example, two 26 inch turntables, the upper half 11'' of each turntable is bolted or otherwise fixed to the cross beam or bolster B' on the platform while the lower half 11 of each turntable forms part of the truck pedestal and the pivot, or king pin, connects the two halves.

Each half-truck pedestal 8 comprises a bottom plate or portion 11', a top plate or portion 11 forming the lower half of its turntable, two segmentally curved vertical side walls 12 connecting said plates, and a central column or bearing tube or sleeve 13 also connecting said plates and which receives the king pin 9 pivotally connecting the pedestal with the upper half 11'' of the turntable on the vehicle body or platform. The pedestal also includes horizontal transverse plates 13' located above and spaced from the bottom plate 11' and connecting the side walls 12 with the bearing tube or sleeve 13. This construction provides a pedestal whose body portion is open from front to rear, as shown at 14, at each side between the sleeve 13 and side walls 12. The bottom plate 11' rests upon the load-sustaining springs 6 mounted on the central portion of the rigid load-sustaining lever 4, whereby the pedestal is resiliently supported for vertical movements under varying loads and for vertical shock absorbing actions.

The inner ends of the arms 1, which are pivotally supported adjacent their outer ends on the wheels 2 and ends of the beam 4, extend convergently from such points of pivotal connection toward each other and toward the pedestal above the beam and the inner ends of the arms are arranged to lie beneath the turntable plate 11 and face each other in line with the openings 14. Between the lever arm portions 8' formed by the inner ends of the arms and disposed in the openings 14, and housed between such ends of the arms and the side walls 12, are the coiled abutment springs 7. The said inner ends of the arms are provided with downwardly projecting hinge knuckles 15 arranged in transverse alinement with similar knuckles 16 formed at the ends of spring plates 17 carried by the pedestal, through which knuckles pass the pivot pins 3, whereby the inner ends of the arms are coupled by flexible pivotal connections 11a with the pedestal.

The flexible pivotal connections 11a between the pedestal body and the arms may consist of any suitable number of spring plates fastened to the pedestal and having forwardly and rearwardly projecting ends provided with knuckles 16 to which the knuckles 15 on the arms are pivotally connected by the bolts 3. In the present instance the use of four such spring plates 17 is shown, two at each side of the center of the pedestal. These plates are fitted in seat recesses 17' formed in the bottom faces of the plates 13' and are firmly secured in position by clamping plates 18 and bolts 18' with their free ends on which the knuckles 16 are formed projecting forwardly and rearwardly for engagement with the bolts 3. These projecting ends of the springs and the bolts 3 form the flexible pivotal connections between the arms and pedestal which through yielding actions allow different degrees of relative rocking movements of the beam 4 and of the arms 1 independent of each other and with or independent of the beam 4, as well as movements of the arms 1 with the pedestal 8 under varying loads, since the flexible connections will accommodate themselves to and compensate for variations in the angularities of movement of the pedestal and arms and the ends of the arms. By this means the bolts 3 are prevented from cramping or binding and are relieved from those strains which would fall upon the bolts if they were directly pivoted to the pedestal body and which would tend to bend or fracture the bolts. As the springs 17 are arranged in parallel relation side by side and extend edgewise horizontally from side to side of the pedestal and arms they effectually resist side thrust and assist greatly in maintaining the stability of the truck.

As set forth, the ultimate weight of the load is carried by the rigid equalizer beam 4 and not by the arms 1, the load weight being transmitted through the pedestal 8 and springs 6 to the beam 4, which beam is permitted to rock on the springs 6 as an axis, such motions in an upward direction being yieldingly opposed through the arms 1 by the springs 7, which also yieldingly oppose independent or conjoint upward rocking motions of the wheel carrying ends of the arms 1, all of such motions of the arms being equalized by the beam 4.

The flexible connections 11a have been devised especially to resist side thrust because the wheel carrying arms do not carry the weight of the load. The arms of the spring blades extend from the pedestal in such a way that the free portion of each spring blade has a length of about 1 inch only, which is enough to allow for the rocking movement of the wheel bearing member. Instead of a single wide spring blade a plurality of comparatively narrow blades are used which project outward on the pedestal side by side. As shown in the drawing, four spring blades, each 4 inches wide, are arranged in a row, separated in two pairs, one of which is to the right and the other pair to the left of the tubular part 13 of the pedestal.

The very short free portions of the spring blades prevent any buckling of such parts of the blades and the horizontal pushing and pulling powers can therefore be transmitted to the truck, notwithstanding the vertical movement of the wheel axles. Said forces follow the axial direction of the spring blades under all prevailing conditions.

Each wheel bearing member or wheel carrying arm has to resist side thrusts liable to cause its deformation in a twisting way. When traversing a curve, the outer half-truck wheel flanges are pressed against the outer rail and the wheel axle, which is short, tends to tilt in its bearing, producing a twisting force on the arm or wheel bearing member and on the flexible connection between the wheel bearing member and the pedestal, and to prevent this the wheel bearing arm, at its top, has been provided with the stop 11b movable to a limited extent in the recess 11c in the turntable base, forming part of the truck pedestal. Only in extreme cases will the stop contact the side walls of the recess, which means that this arrangement represents a safety factor, protecting the flexible connection from twisting forces tending to disrupt the spring blades.

The centrifugal force, exerted by the rail on the wheel flange, brings about a vertical force, exerted on the wheel bearings. On a curve the inner part of the wheel journal presses upwards whilst the outer part is pressed down as the wheel tends to tip over to the outside of the curve. Hence, the bearings used on present day railway trucks, having steel connecting cross axles, offer no support underneath the wheel axle. Therefore, full bearings have to be used, preferably ball or roller bearings. Contrary to the usual cross axle construction, each wheel axle in my invention is carried by two bearings instead of one, which facilitates the use of ball or roller bearings of normal size.

What I claim is:

1. In a truck construction of the character described, a pair of independent pedestals pivotally secured to a vehicle on which they are mounted, an equalizer beam extending longitudinally below each pedestal, arms pivotally connected adjacent their inner ends to and extending forwardly and rearwardly from each pedestal, said arms having lever arm portions extending inwardly toward each other beyond the pivotal connections, a wheel journaled at the outer end of each arm, the arms associated with each pedestal being pivotally mounted at their outer ends on the ends of the associated beam, abutment springs on each pedestal disposed between the lever arm portions of the associated arms, load sustaining springs supporting the pedestals from the beams, and means connecting the beams and parts carried thereby to swing in unison on their pedestal pivots.

2. In a truck, a pair of spaced axles, an equalizer beam extending longitudinally between the axles, a load transmitting pedestal disposed above the center of the beam, arms pivotally and flexibly secured adjacent their inner ends to said pedestal and upon the outer ends of which the axles are journaled, said inner ends of the arms having lever arm portions extending toward each other inwardly beyond their pivotal connections with the pedestal and said outer ends of the arms being pivotally mounted upon the outer ends of the beam, abutment springs disposed between the lever arm portions of said arms, load carrying springs disposed below and supporting the pedestal from the beam, and a turntable member secured to the top of said pedestal.

3. In a truck, independent turntable members at each side of the truck, a load transmitting pedestal secured to each of said turntable members, a pair of vertically rocking arms flexibly pivoted at their inner ends to and extending forwardly and rearwardly from each pedestal, resilient abutment means arranged between the inner ends of the arms of each pair and opposing upward swinging movements of the arms, wheels journaled on the outer ends of the arms of each pair in longitudinal alignment with each other and in the vertical plane of the track on which they are designed to run, a rigid equalizer beam extending longitudinally at each side of the truck beneath the pedestal and arms at said side of the truck and pivotally engaged at its end with the outer ends of said arms, load bearing springs disposed beneath and supporting each pedestal from the underlying beam whereby each wheel at each side of the truck is free to move vertically independently of the other, and means connecting the pedestals for movement in unison.

4. A vehicle truck including in combination a pair of spaced wheel axles, a rigid equalizer beam, extending longitudinally between the axles, a load transmitting element disposed substantially above the center of the beam, resilient load sustaining means disposed between and supporting the load transmitting element from the beam and permitting rocking motion of the beam relatively to said element, and wheel carrying arms arranged above the beam on opposite sides of the load transmitting element and articulately connected at their outer ends to the axle and ends of the beam and at their inner ends to the load transmitting element.

5. In a vehicle truck, the combination of spaced wheel axles, a rigid equalizer beam extending longitudinally between the axles, a pedestal disposed substantially above the center of the beam, resilient load sustaining means disposed between and supporting the pedestal from the beam, axle carrying arms pivotally coupled at their outer ends to the axles and ends of the beam and at their inner ends to the pedestal, the portion of the arms between the outer and inner pivotal points being arranged on opposite sides of the pedestal above the beam, and resilient means between the inner ends of the arms and yieldingly opposing relative inward and downward movement thereof on depression of the pedestal.

6. In a truck, a longitudinally extending equalizer beam, a load transmitting pedestal disposed above the center of the beam, wheel carrying arms pivotally connected at their outer ends to the ends of the beam, horizontal leaf springs carried by the pedestal to which the inner ends of the said arms are pivoted, wheels mounted on the outer ends of said arms, and coiled load carrying springs carried by the beam below the pedestal and supporting said pedestal.

7. In a truck, a load transmitting pedestal, wheel carrying arms, leaf springs carried by the pedestal to which the inner ends of the arms are pivoted, said ends of the arms having lever arm portions extending toward each other inwardly beyond the pivots, shock absorber springs disposed between the lever arm portions of said arms, wheels mounted on the outer ends of said arms, a rigid beam extending longitudinally between the wheels and to which the outer ends of the arms are pivoted, coiled load carrying springs carried by the beam below and supporting the pedestal, and a turntable member secured to the top of said pedestal.

8. In a truck, independent turntable members at each side of the truck, a load transmitting pedestal secured to each of said turntable members, a pair of arms flexibly pivoted at their inner ends to and respectively extending forwardly and rearwardly from each pedestal, said ends of the arms having lever arm portions extending toward the pedestals beyond their pivots, abutment springs disposed between the lever arm portions of each pair of arms and arranged within the pedestal, wheels journaled on the outer ends of each pair of arms in longitudinal alignment and in the vertical plane of the track on which they are designed to run, a rigid equalizer beam at each side of the truck extending between the wheels at that side and to which the outer ends of the arms at said side are pivoted, coiled load carrying springs mounted on the beams beneath and supporting the said pedestals whereby each wheel at each truck side is free to move vertically independently of the other wheel at the same side, and links connecting the pedestals with each other.

9. In a vehicle truck, the combination of spaced wheel axles, an equalizer beam extending longitudinally between the axles, a pedestal disposed substantially above the center of the beam, a turntable at the top of the pedestal, resilient load sustaining means disposed between and supporting the pedestal from the beam, axle carrying arms pivotally coupled at their outer ends to the axle and ends of the beam and at their inner ends to the pedestal, the portions of the arms between the outer and inner pivotal points being arranged on opposite sides of the pedestal above the beam, and abutment springs between the inner ends of the arms above their pivotal connections with the pedestal and yieldingly opposing relative inward movement of said ends of the arms on their pivotal connections.

10. In a vehicle truck, the combination of spaced wheel axles, an equalizer beam extending longitudinally between the axles, a pedestal disposed substantially above the center of the beam, load sustaining springs disposed between and supporting the pedestal from the beam, axle carrying arms pivotally coupled at their outer ends to the axle and ends of the beam, means flexibly and pivotally connecting the arms at their inner ends below their horizontal centers to the pedestal, the portions of the arms between the outer and inner pivotal points being arranged on opposite sides of the pedestal above the beam, and abutment springs between the inner ends of the arms above their pivotal connections.

11. A vehicle truck including in combination a pair of spaced wheel axles, an equalizer beam extending longitudinally between the axles, a pedestal disposed substantially above the center of the beam, load sustaining spring means disposed between and supporting the pedestal from the beam, axle carrying arms pivotally coupled at their outer ends to the axle and ends of the beam and at their inner ends to the pedestal, the portions of the arms between the outer and inner pivotal points being arranged on opposite sides of the pedestal above the beam, and spring means disposed between the inner ends of the arms and yieldingly opposing relative inward and downward movement thereof on depression of the pedestal.

12. In a vehicle truck, the combination of spaced wheel axles, an equalizer beam extending longitudinally between the axles, a pedestal disposed substantially above the center of the beam, resilient load sustaining means disposed between and supporting the pedestal from the beam, axle carrying arms pivotally coupled at their outer ends to the axle and ends of the beam, flexible pivotal connections between the inner ends of said arms and the pedestal, the portions of the arms between the outer and inner pivotal points being arranged on opposite sides of the pedestal above the beam, and resilient means between the inner ends of the arms yieldingly opposing movement of said ends of the arms toward each other.

13. In a vehicle truck, the combination of spaced wheel axles, an equalizer beam extending longitudinally between the axles, a pedestal disposed substantially above the center of the beam, resilient load sustaining means disposed between and supporting the pedestal from the beam, axle carrying arms pivotally coupled at their outer ends to the axle and ends of the beam, leaf spring coupling means carried by the pedestal to which the inner ends of the arms are pivoted, the portions of the arms between the outer and inner pivotal points being arranged on opposite sides of the pedestal above the beam, and resilient abutment means between the inner ends of the arms above their pivotal connections.

14. In a vehicle truck, the combination of spaced wheel axles, an equalizer beam extending longitudinally between the axles, a pedestal disposed substantially above the center of the beam, load sustaining means disposed between and supporting the pedestal from the beam, axle carrying arms pivotally coupled at their outer ends to the ends of the beam, and a plurality of leaf springs arranged side by side on the pedestal and to which the inner ends of the arms are pivotally connected.

15. In a truck, a pair of wheels, a load transmitting pedestal, rigid arms pivotally connected at their inner ends to said pedestal and at their outer ends to the wheels, a balancing lever comprising a rigid member formed independent of the arms and extending longitudinally between the wheels and articulately connected at its ends to the wheels and outer ends of the arms, and spring means independent of the lever seated on the lever and resiliently supporting the pedestal from the lever.

16. In a truck of the character described, spaced wheels, a rigid equalizer beam extending longitudinally between the wheels, a swivelled load transmitting pedestal disposed above the beam and centrally between the wheels, rigid rocker arms formed independently of and arranged above the beam and pivotally mounted at their outer ends on the wheels and ends of the beam and pivotally connected at their inner ends to the pedestal, said arms extending convergently above the beam from their outer pivoted ends to their inner pivoted ends, and load carrying springs independent of the beam seated on the beam and disposed between the same and the pedestal and resiliently supporting the pedestal from the beam.

17. In a truck, a pair of spaced wheel carrying axles, a rigid equalizer beam extending longitudinally between the axles and having channeled portions, a load transmitting pedestal disposed above the center of the beam, rigid axle carrying arms arranged above the beam and pivotally engaged at their outer ends with the axles and ends of the beam and flexibly secured at their inner ends to the pedestal, and load carrying spring means seated in the channeled portions of the beam beneath the pedestal and supporting said pedestal from the beam.

HENRI W. JONKHOFF.

REFERENCES CITED

The following references are of record in the file of this patent:

UNITED STATES PATENTS

| Number | Name | Date |
| --- | --- | --- |
| 173,919 | Dotterer | Feb. 22, 1876 |
| 870,607 | Amberg | Nov. 12, 1907 |
| 1,120,407 | Riegel | Dec. 8, 1914 |
| 1,576,298 | Barbey et al. | Mar. 9, 1926 |
| 1,652,265 | Baker | Dec. 13, 1927 |
| 2,197,727 | Ledwinka | Apr. 16, 1940 |
| 2,242,851 | Flowers | May 20, 1941 |
| 2,271,195 | Joy | Jan. 27, 1942 |
| 2,342,484 | Pancake et al. | Feb. 22, 1944 |

FOREIGN PATENTS

| Number | Country | Date |
| --- | --- | --- |
| 499,364 | England | Jan. 23, 1939 |
| 702,493 | Germany | Feb. 8, 1941 |